US009849576B2

(12) United States Patent
Tussing

(10) Patent No.: US 9,849,576 B2
(45) Date of Patent: Dec. 26, 2017

(54) TOOL ATTACHMENT FOR A HANDHELD MACHINE TOOL

(71) Applicant: Robert Bosch GmbH, Stuttgart (DE)

(72) Inventor: Torsten Tussing, Koengen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 854 days.

(21) Appl. No.: 14/079,786

(22) Filed: Nov. 14, 2013

(65) Prior Publication Data

US 2014/0133898 A1 May 15, 2014

(30) Foreign Application Priority Data

Nov. 15, 2012 (DE) .................. 10 2012 220 910
Jul. 15, 2013 (DE) .................. 10 2013 213 806

(51) Int. Cl.
*B25F 5/00* (2006.01)
*B25F 3/00* (2006.01)
*B23B 31/02* (2006.01)
*B25B 23/00* (2006.01)

(52) U.S. Cl.
CPC ............. *B25F 5/00* (2013.01); *B23B 31/026* (2013.01); *B25B 23/0007* (2013.01); *B25F 3/00* (2013.01); *Y10T 403/32418* (2015.01)

(58) Field of Classification Search
CPC ...... B25F 3/00; B25F 5/02; B25F 5/00; B25B 21/00; B25B 31/026; B25B 23/0007; B25B 23/0028; Y10T 403/32418

USPC ....... 173/217, 216, 29; 81/57.13; 279/142, 5
See application file for complete search history.

(56) References Cited

U.S. PATENT DOCUMENTS

| 5,577,425 | A | * | 11/1996 | Holmin ..................... B25F 5/02 |
| | | | | 81/57.13 |
| 6,138,364 | A | * | 10/2000 | Schmitz ................. B23D 49/11 |
| | | | | 173/29 |
| 6,497,418 | B2 | | 12/2002 | Yahagi |
| 6,536,780 | B2 | | 3/2003 | Baumann et al. |

FOREIGN PATENT DOCUMENTS

| CN | 200942566 Y | 9/2007 |
| CN | 101195216 A | 6/2008 |
| FR | 2 704 793 | 11/1994 |
| JP | 2001287176 A | 10/2001 |

* cited by examiner

*Primary Examiner* — Michelle Lopez
(74) *Attorney, Agent, or Firm* — Norton Rose Fulbright US LLP

(57) ABSTRACT

In a tool attachment having an attachment housing on which a fastening interface is situated for fastening to an handheld machine tool, the fastening interface having an angular position setting unit for setting a specified angular position of the tool attachment on the handheld machine tool, and being equipped with a locking unit which, in a locked state, locks the tool attachment for operation on the handheld machine tool in the specified angular position, and, in the unlocked state, makes possible drawing the tool attachment away from the handheld machine tool, the angular position setting unit is operable in the locked state of the locking unit, to enable a change in the specified angular position.

15 Claims, 5 Drawing Sheets

TOOL ATTACHMENT FOR A HANDHELD MACHINE TOOL

RELATED APPLICATION INFORMATION

The present application claims priority to and the benefit of German patent application no. 10 2012 220 910.7, which was filed in Germany on Nov. 15, 2012, and German patent application no. 10 2013 213 806.7, which was filed in Germany on Jul. 15, 2013, the disclosures of both of which are incorporated herein by reference.

FIELD OF THE INVENTION

The present invention relates to a tool attachment having an attachment housing, at which a fastening interface is situated for fastening to a handheld machine tool, the fastening interface having an angular position setting unit for setting a specified angular position of the tool attachment on the handheld machine tool, and is equipped with a locking unit which, in a locked state, locks the tool attachment for operation on the handheld machine tool in the specified angular position and in the unlocked state, makes possible drawing the tool attachment away from the handheld machine tool.

BACKGROUND INFORMATION

A tool attachment is discussed in French document FR 2 704 793 A1, which has a fastening interface for fastening to an handheld machine tool, which is equipped with an angular position setting unit and a locking unit. The angular position setting unit is used for setting a specified angular position of the tool attachment on the handheld machine tool. The locking unit is used, in an associated unlocked state, to make possible the mounting or drawing away of the tool attachment onto or from the handheld machine tool respectively, and in an associated locked state, to lock the tool attachment for operating on the handheld machine tool in the specified angular position. In addition, the locking unit is able to be transferred to an intermediate state, in which neither drawing the tool attachment away from the handheld machine tool nor an operation of the handheld machine tool is possible, but rather an operation of the angular position setting unit for changing the specified angular position.

It is believed that a disadvantage in the related art is that the handling of such a tool attachment is cumbersome and complicated, and may thus lead to a loss in convenience for a user of the tool attachment.

SUMMARY OF THE INVENTION

It is therefore one object of the present invention to provide a new tool attachment that is able to be fastened in a specified angular position on a handheld machine tool, and in which a change in the specified angular position is able to take place in a manner that is uncomplicated, rapid and convenient for a user.

This object may be attained by a tool attachment having an attachment housing, on which is situated a fastening interface for fastening to an handheld machine tool. The fastening interface has an angular position setting unit for setting a specified angular position of the tool attachment on the handheld machine tool, and is equipped with a locking unit which, in a locked state, locks the tool attachment for operation on the handheld machine tool in the specified angular position, and in the unlocked state, makes possible drawing the tool attachment away from the handheld machine tool. The angular position setting unit is operable in the locked state of the locking unit, to make possible a change in the specified angular position.

Consequently, the present invention makes possible providing a tool attachment in which, by the operation of an angular position setting unit in the locked state of the locking unit, a change in the respective angular position may be achieved. Thus, one may do without the operation of the locking unit before and after operating the angular position setting unit, so that the change of the respective angular position may be sped up in a simple manner, and the design is thus more convenient for a user of the tool attachment.

According to one specific embodiment, the angular position setting unit is operable by a combined longitudinal and rotational motion of the attachment housing for changing the specified angular position.

The present invention thus makes possible providing a tool attachment in the case of which the complete attachment housing forms a large-area operating area, which is consequently able to be securely gripped and held by the user for operating it during an angular position change.

The angular position setting unit may have an holding fixture element that is rigidly connected to the attachment housing.

Thus a simple and stable angular position setting unit may be provided.

The attachment housing and the holding fixture element may be configured as one piece.

Consequently, the attachment housing and the holding fixture element may be configured as one robust individual component.

The holding fixture element may be configured tube-shaped, at least in sections, and has an holding fixture toothing at its end face.

Thus an uncomplicated and cost-effective holding fixture element may be provided.

The holding fixture element may be supported in the locking unit, in a longitudinally and rotationally movable manner.

Thus, a secure and reliable functioning of the angular position setting unit is ensured in a simple manner.

According to one specific embodiment, the locking unit has a locking body, particularly a locking body that is configured tube-shaped at least in sections.

Thus, the present invention makes possible providing a tool attachment having a robust and cost-effective locking body.

The locking body may have locking elements which are configured like bayonets so as to develop a bayonet connection Thus a robust and reliable locking of the tool attachment to the associated handheld machine tool is enabled.

The locking unit may have an operating ring situated on the locking body, which is able to be operated to lock the locking body to the handheld machine tool.

Thus, an uncomplicated and convenient operation of the locking unit may be enabled.

The locking body and the operating ring may be configured in one piece.

Thus the locking body and the operating member may be configured as one cost-effective and robust component.

According to one specific embodiment, a spring element is situated on the locking body, which is configured to apply a specified spring force to the attachment housing in the direction of the handheld machine tool, in the locked state.

The present invention thus makes it possible to provide a tool attachment, in which the attachment housing is acted upon in the direction of the handheld machine tool, in a simple manner.

In the locked state, the attachment housing is displaceable in a direction pointing away from the handheld machine tool, against the specified spring force.

Thus, an uncomplicated and convenient handling of the tool attachment may be enabled.

According to one specific embodiment, a drive shaft is provided to which an operating member is assigned which is configured, during fastening of the tool attachment to the handheld machine tool, to displace a locking sleeve, associated with a tool holding fixture of the handheld machine tool, against a spring force applied by an associated element in the direction of the handheld machine tool.

Thus the present invention makes possible providing a tool attachment in which, by the operation of the locking sleeve of a tool holding fixture associated with the handheld machine tool, by an operating member associated with the tool attachment for mounting the tool attachment, the tool holding fixture is able to be unlocked, and thus a reduction is able to be made in the tangential and radial play that is present between a drive shaft of the tool holding fixture and a tool holding fixture of the handheld machine tool.

The problem mentioned at the outset is also solved by a handheld machine tool having a transmission housing, on which a fastening interface is provided for a tool attachment that is locked against rotation. The fastening interface is configured to enable a fastening of the tool holding fixture to the transmission housing aligned at a specified angular position.

The problem mentioned at the outset is, in addition, also solved by a tool system having a handheld machine tool and a tool attachment, which has an attachment housing on which there is situated a fastening interface for fastening to the handheld machine tool. The fastening interface has an angular position setting unit for setting a specified angular position of the tool attachment on the handheld machine tool, and is equipped with a locking unit which, in a locked state, locks the tool attachment for operation on the handheld machine tool in the specified angular position, and in the unlocked state, makes possible drawing the tool attachment away from the handheld machine tool. The angular position setting unit is operable in the locked state of the locking unit, to make possible a change in the specified angular position.

The present invention is explained in greater detail in the following description on the basis of exemplary embodiments illustrated in the drawings.

DETAILED DESCRIPTION

Figure 1:
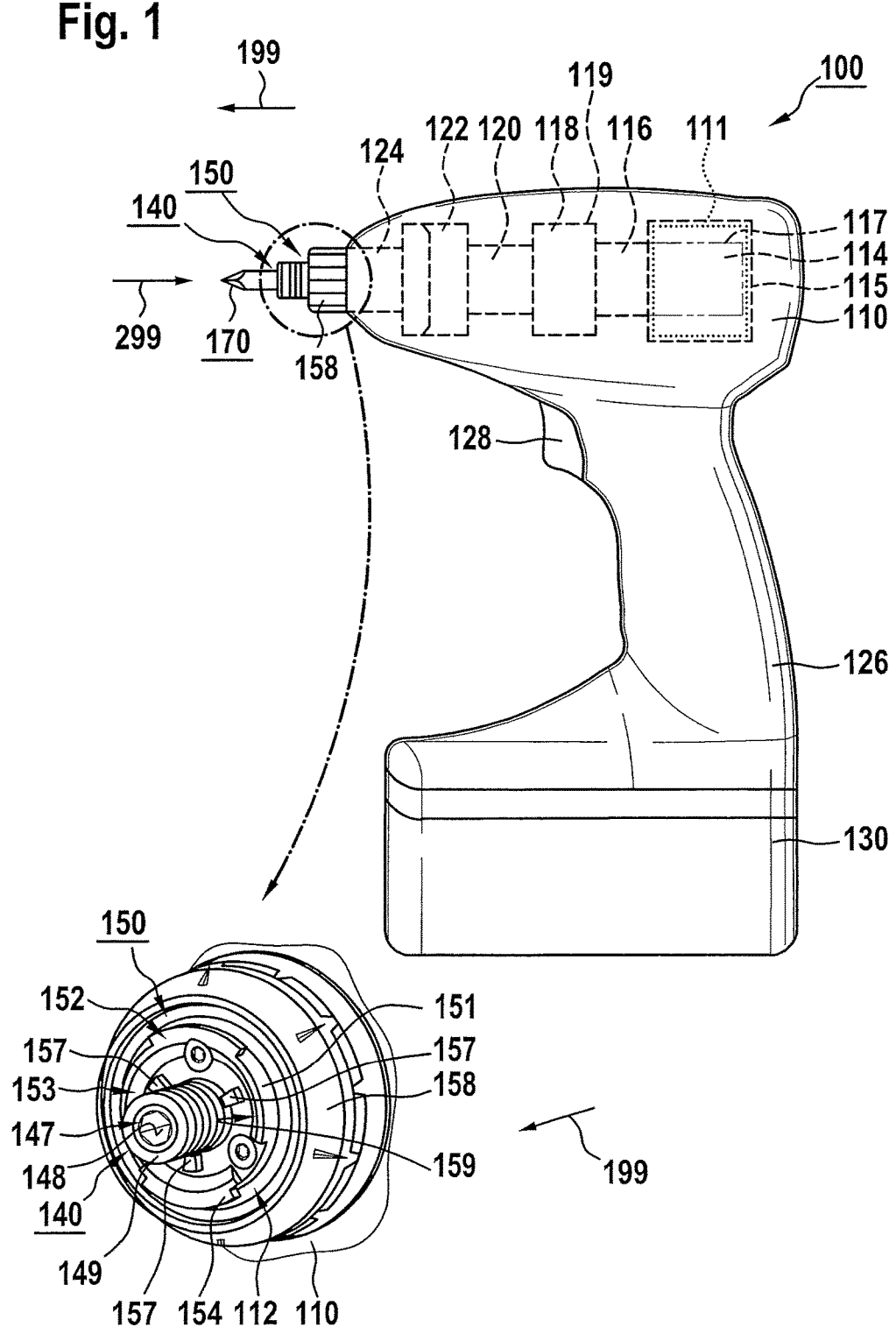
FIG. 1 shows a schematic view of an handheld machine tool having a tool holding fixture and a fastening interface according to one specific embodiment.

FIG. 1 shows an handheld machine tool 100 equipped with a tool holding fixture 140, which has a housing 110 having a handle 126. According to one specific embodiment, handheld machine tool 100 is able to be connected, mechanically and electrically, to a rechargeable battery pack 130 for a power supply that is network-independent.

Handheld machine tool 100 is configured as a battery-driven rotary blow screwdriver, by way of example. It should be pointed out, however, that the present invention is not limited to battery-driven rotary blow screwdrivers, but rather that it can find application in different types of handheld machine tools, which have a tool holding fixture corresponding to tool holding fixture 140, independently of whether the handheld machine tool is able to be operated electrically, i.e. network-independently using battery pack 130 or network-dependently, and/or non-electrically.

In housing 110, there are situated an electric drive motor 114 supplied with current by battery pack 130, a transmission 118 and an optional striking mechanism 122. Drive motor 114 is able to be operated by a hand switch 128, for example, i.e. is able to be switched on and off, and may be able to be controlled or regulated in such a way that both a reversing operation and a specification with respect to a desired rotational speed are able to be implemented.

According to one specific embodiment, drive motor 114 is an electronically commutated drive motor, which may be a DC motor which illustratively has stator and rotor components 111 and 117, respectively. In this instance, stator components 111 form an outer stator and rotor components 117 form an inner rotor, for example. It should be pointed out, however, that the description of a drive motor configured as an electronically commutated drive motor, having an outer stator and an inner stator, has only an exemplary character and should not be understood as a restriction on the present invention, which may also be used in the case of a drive motor having an inner stator and an outer rotor or, for example, in the case of a commutator motor having brushes.

Drive motor 114 is connected to transmission 118, via an associated motor shaft 116, which converts a rotation of motor shaft 116 to a rotation of a drive member 120 that is provided between transmission 118 and striking mechanism 122, for example, a drive shaft. This conversion may take place in such a way that drive shaft 120 rotates with respect to motor shaft 116 at an increased torque, but decreased rotational speed.

Drive motor 114 is situated illustratively in a motor housing 115, and transmission 118 in a transmission housing 119, transmission housing 119 and motor housing 115 being situated in housing 110, for example.

Optional striking mechanism 122 connected to drive member 120 is a turning or rotational striking mechanism, which generates abrupt rotating pulses at high intensity, and transmits them to an output shaft 124, such as an output spindle. An exemplary striking mechanism, by which striking mechanism 122 is able to be implemented, is described in DE 20 2006 014 850 U1, to which we here expressly make reference, and whose teachings should be understood to be a part of the present description, so that in this case, for the purpose of brevity, a detailed description of striking mechanism 122 may be omitted.

Tool holding fixture 124 is configured on output shaft 124, which illustratively has an accommodation body 147 has an inner polygonal accommodation 148, which is provided for the accommodation of insertable tools having outer polygonal couplings. On the outer circumference of accommodation body 147 that is connected to output shaft 124, for instance torsionally fixed and/or in one piece, there is situated, for instance, a locking sleeve 149 for locking suitable insertable tools in inner polygonal accommodation 148, that is spring-loaded by a spring element (497 in FIGS. 4 and 5) in an axial direction 199 facing away from handheld machine tool 100.

Tool holding fixture 140 is configured, for example, in the manner of a bit holder, that is, for accommodating an insertable tool 170 which is inserted in the direction of handheld machine tool 100 into inner polygonal accommodation 148, as indicated by an arrow 299. Such a screwdriver bit, which is of a so-called HEX type, is sufficiently known from the related art so that, at this place, a detailed description may be omitted for the purpose of conciseness in the description. It should be pointed out, however, that the present invention is not limited to the use of HEX screwdriver bits, but that additional insertable tools could also be applied depending on a respectively selected embodiment of tool holding fixture 140, such as HEX drills or so-called SDS-Quick insertable tools. Beyond that, we wish to point out that the design and the manner of functioning of a suitable bit holder are also sufficiently well known to one skilled in the art, so that, in this case, for the sake of brevity, we may omit a detailed description of bit holder 140.

Figure 4:
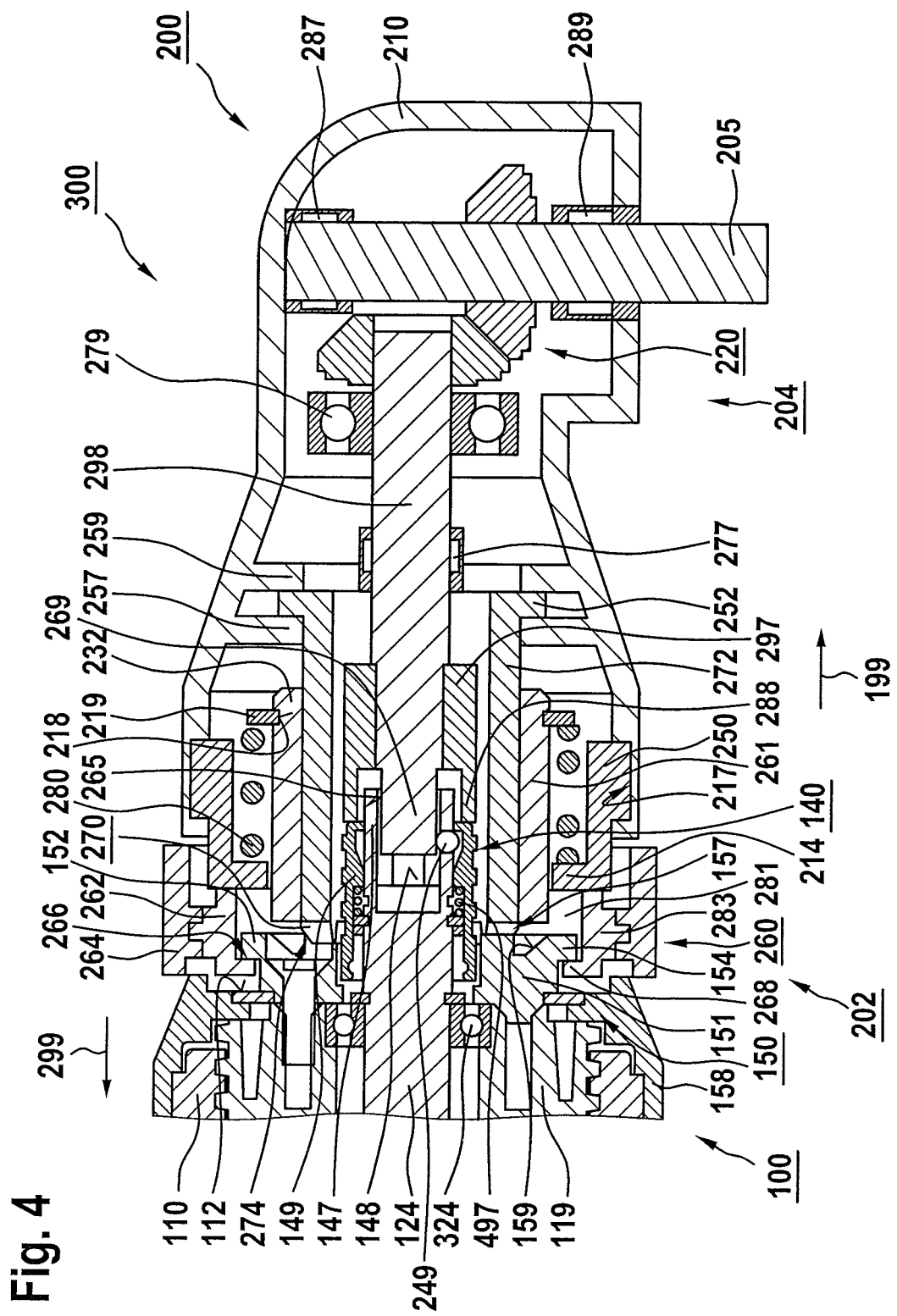
FIG. 4 shows an exemplary tool system, which illustratively has handheld machine tool of FIG. 1 and angular attachment of FIGS. 2 and 3, for the illustration of an exemplary mounting of an angular attachment on a handheld machine tool.
Figure 5:
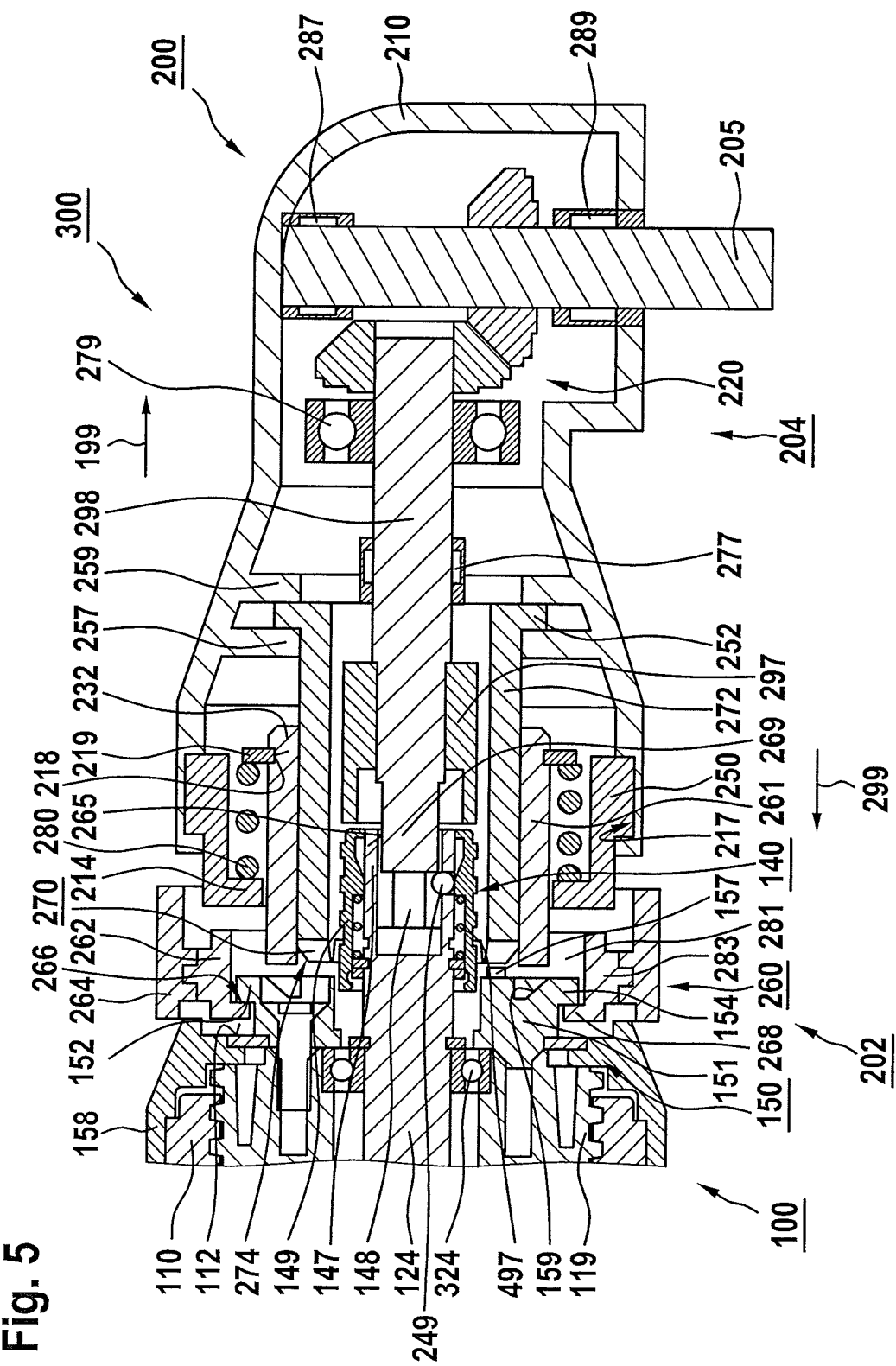
FIG. 5 shows a sectional view of a tool system according to one specific embodiment, having the tool attachment of FIGS. 2 and 3 fastened on the handheld machine tool of FIG. 1, during an angular position change of the tool attachment.

According to one specific embodiment, a fastening interface 150 is assigned to handheld machine tool 100, which is fastened illustratively in the region of bit holder 140 on housing 110 in a manner immovable axially and radially, and which is subsequently designated as "machine interface 150", for the sake of clarity. Machine interface 150 may be fastened axially and radially immovable on transmission housing 119, as shown in FIGS. 4 and 5. We should point out, however, that machine interface 150 is only configured in exemplary fashion as a separate component, and, alternatively to this, is also able to be configured as in one piece with transmission housing 119.

Machine interface 150 is used to fasten an associated tool attachment (200 in FIG. 2), particularly a fastening aligned at a specified angular position, and has, illustratively, a fastening element 151 that is fastened, locked against rotation, to housing 110 and/or transmission housing 119 at an end face 112 of housing 110. Fastening element 151 is configured, at least in sections, to be sleeve-shaped or ring-shaped, for example, and is fastened in the region of a terminal sleeve or protective sleeve 158, situated at the end face 112 annularly on housing 110, using suitable fastening members, such as screws or rivets, but alternatively to this, may also be configured in one piece with housing 110 and/or transmission housing 119. Fastening element 151 sheathes bit holder 140, which may be at least in sections, at a specified radial distance, in order to make possible an axial displacement of locking sleeve 149 of bit holder 140 on the inside of fastening element 151.

Fastening element 151 may be configured to enable an axial centering that is locked against rotation of an associated tool attachment (200 in FIG. 2) on housing 110, which is described below in conjunction with FIGS. 4 and 5. Fastening element 151 illustratively has at its outer circumference at least two holding members 152, 154, which are configured like bayonets for the development of a bayonet connection. It should be pointed out, however, that the description of such a bayonet connection only has an exemplary character, and is not used to restrict the present invention. Rather, alternative fastening possibilities may also be used, such as a so-called wire bracket lock or ball lock, etc.

Moreover, at the inner circumference of fastening element 151, a centering aid 153 configured as a type of annular conical surface 153 is provided. Furthermore, fastening element 151 has at least one and for example three holding fixture members 157. We should point out, however, that the embodiment of centering aid 153 and the stated number of holding fixture members 157 have only exemplary character, and are not used for restricting the present invention. Rather, other embodiments and numbers are possible, for instance, centering aid 153 may have, instead of an annular conical surface 159, a plurality of conical arc sections, and instead of the three holding fixture members 157, six or more holding fixture members may be used, etc.

Figure 2:
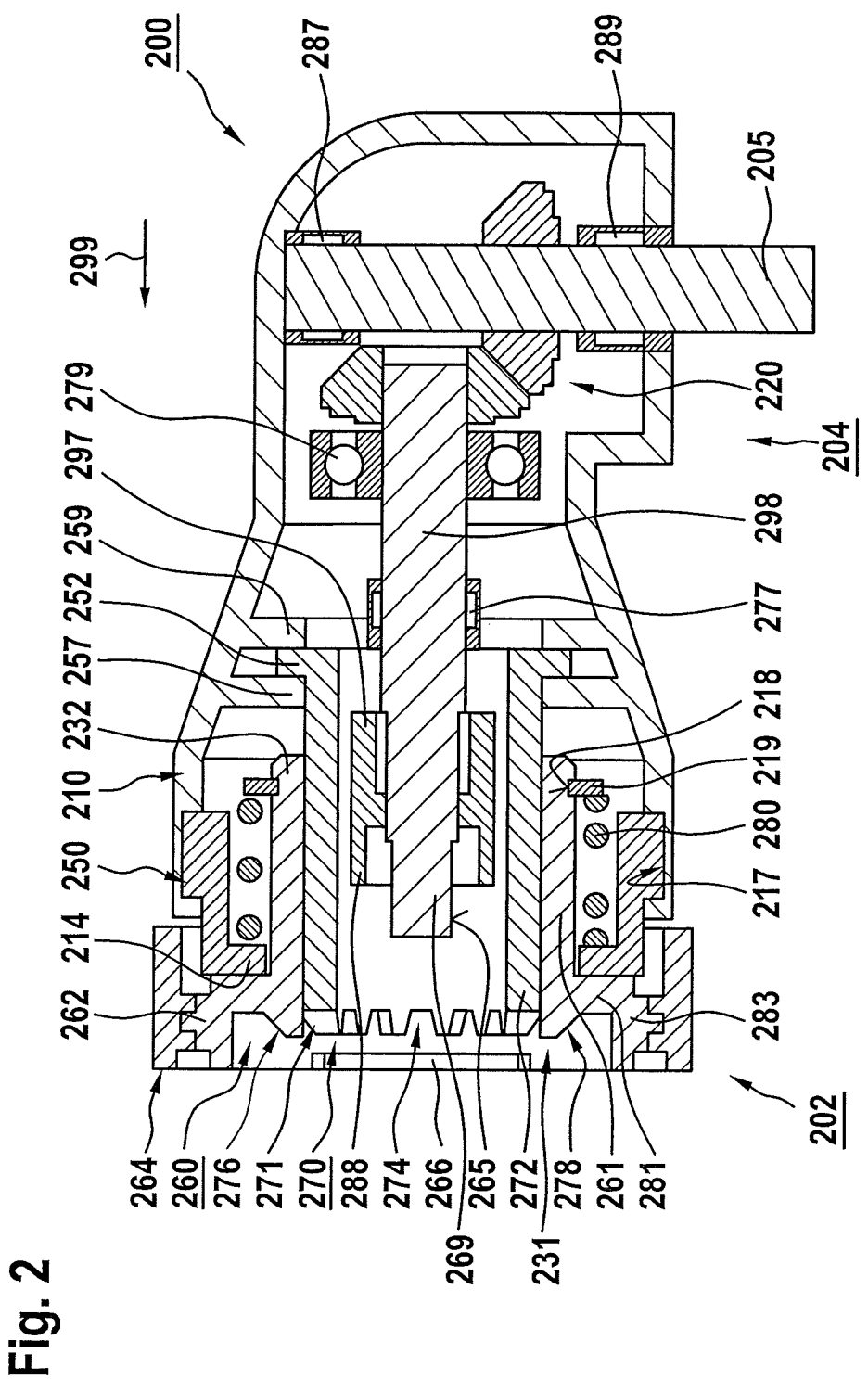
FIG. 2 shows a sectional view of a tool accommodation having a fastening interface for fastening to a handheld machine tool, according to one specific embodiment.

FIG. 2 shows an exemplary tool attachment 200 which, according to one specific embodiment, is configured for fastening to machine interface 150 of handheld machine tool 100 of FIG. 1. Tool attachment 200 is configured, according to one specific embodiment, in the manner of an angle attachment and has, in an exemplary manner, a fastening interface 202 designated below, for the purpose of clarity of description, as "attachment interface", as well as a drive unit 204 that is designated below also as an "angle drive section". It should be pointed out, however, that tool attachment 200 is configured as an angle attachment only in exemplary fashion, and not for restricting the present invention. Rather, tool attachment 200 may have any desired embodiment, e.g. of the type of an eccentric attachment, etc. To simplify the description, tool attachment 200 is therefore also designated below as "angle attachment 200".

Angle drive section 204 has an attachment housing 210, in which a rotating drivable drive shaft 298 is supported rotationally movably on two bearing elements 277, 279. Drive shaft 298 is used to drive a drive shaft 205 that is situated at a specified angle to this, illustratively 90°, which is also supported rotationally movably in attachment housing 210, for instance, in two bearing elements 287, 289, and may be configured, for example, to accommodate screwdriver bits 170 of FIG. 1. In this instance, drive shaft 298 drives output shaft 205 via a suitable conversion 220. It should be pointed out, however, that a suitable implementation of angle drive section 204 is sufficiently known from the related art so that we may omit a detailed description of angle drive section 204 for the sake of brevity.

In the area of the free end 269 of drive shaft 298 facing away from angle drive section 204, on which there is configured, for instance, a polygonal drive contour 265, there is an angle setting element 272 that is configured to be sleeve-shaped or tube-shaped, at least in regions, through which drive shaft 298 penetrates. This angle setting element 272 may be rigid, i.e. connected to attachment housing 210 axially and radially immovable and/or configured in one piece with it. Angle setting element 272 illustratively has at its axial end, facing angle drive section 204, an outer annular collar 252 which is situated axially and radially immovable between two projections 257, 259 of attachment housing 210 that are configured ring-shaped, for example, for instance, by being pressed or jammed in. At its other axial end 271, an end face holding fixture toothing 274 is provided.

In addition, an operating member 297, that is provided with a free end 288, is assigned to drive shaft 298, which encloses drive shaft 298 in a sleeve-shaped manner, at least in sections, and whose functionality will be described in detail below, in connection with FIGS. 4 and 5. Alternatively to this, drive shaft 298 and operating member 297 may also be configured in one piece. Operating member 270 is situated, for instance, on the inside of angle setting element 272, and may be at a distance from it.

According to one specific embodiment, drive shaft 298 is rotatable relative to operating member 297. In this case, drive shaft 298 may be supported rotationally movable, for example, in a friction bearing that is pressed into operating member 297, e.g. a sintered metal bearing.

Attachment interface 202 is used to fasten tool attachment 200 to an assigned handheld machine tool, such as handheld machine tool 100 of FIG. 1, and illustratively has an angular position setting unit 270 to which angle setting element 272 is assigned, as well as a locking unit 260. Locking unit 260 is configured to lock tool attachment 200 in a locked state for operation to the handheld machine tool at a specified angular position, and in an unlocked state, to make possible withdrawing tool attachment 200 from the handheld machine tool. Angular position setting unit 270 is configured to make possible the setting of the specified angular position of tool attachment 200 for operation on the handheld machine tool. In this connection, angular position setting unit 270, according to one specific embodiment, is operable in the locked state of locking unit 260, in order to make possible a change in the specified angular position, as will be described below, in the case of FIG. 5. Such an operation for changing the specified angular position may take place by a combined longitudinal and rotational motion of attachment housing 210.

According to one specific embodiment, locking unit 260 has a locking body 262, especially a locking body configured tube-shaped at least in sections, or a locking body provided with a tube-shaped accommodation section 261. In tube-shaped accommodation section 261, and thus in locking unit 260, holding fixture element 272 is supported longitudinally and rotationally movable. At an axial end of locking body 262 facing away from angle drive section 204, the former goes over, via an annular shoulder 281, from a tube-shaped accommodation section 261, on the one hand, to a broadened region 283 and, on the other hand, to a centering member 231 which, for example, has at least two arched centering regions 276, 278, that are beveled in the longitudinal direction of tool attachment 200, i.e. in direction 299 of FIG. 1. We should point out, however, that centering member 231, has the at least two arched, beveled centering regions 276, 278 only in an exemplary manner, and not for the restriction of the present invention. Rather, centering member 231 may also have a single centering region configured in the manner of a frustum.

In broadened region 283, which may be at least two locking elements 266 (and 268 in FIG. 3) are provided, which are configured, for example, like bayonets, for the development of a bayonet connection. Furthermore, on the outer circumference of this broadened region 283, an operating ring 264 is situated, for example, which is operable for the locking of locking body 262 on the handheld machine tool, locking body 262 and operating ring 264 being able to be configured in one piece. On the outer circumference of tube-shaped accommodation section 261, a resetting sleeve 250 is illustratively supported to be axially and radially movable. The latter is supported using an annular collar 214, which is configured on the axial end of resetting sleeve 250 facing annular shoulder 281 of tube-shaped accommodation section 261, against annular shoulder 281, and engages at its other axial end with a ring groove 217 provided on attachment housing 210. Alternatively to this, resetting sleeve 250 may be connected in an attached form to attachment housing 210 and/or may be configured in one piece with it.

In addition, between annular collar 214 and a securing ring 219, situated in an outer ring groove 218 of tube-shaped accommodation section 261, a spring element 280 is provided, for instance a pressure spring, which stresses resetting sleeve 250, using a specified spring force, in the direction of annular shoulder 281, i.e. in direction 299 of FIG. 1. Ring groove 218 is configured, for example, in the region of an axial end 232 of tube-shaped accommodation section 261 facing angle drive section 204.

Figure 3:
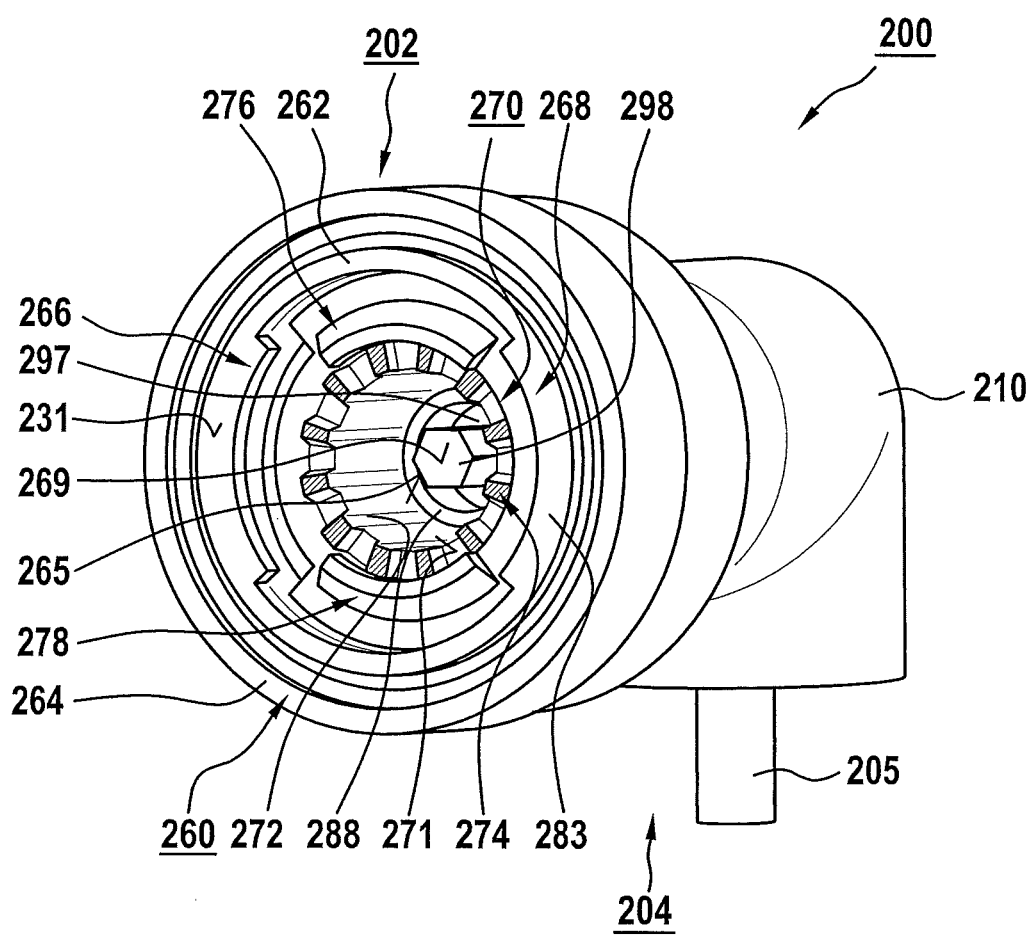
FIG. 3 shows a perspective rear view of the tool attachment of FIG. 2.

FIG. 3 shows tool attachment 200 of FIG. 2, in which locking unit 260 has, for instance, locking element 266 of FIG. 2 that is configured, for example, like a bayonet as well as an additional locking element 268 configured like a bayonet. In addition, FIG. 3 clarifies the two arched, beveled centering regions 276, 278, polygonal drive contour 265 of drive shaft 298 as well as the end face holding fixture toothing 274 of holding fixture element 272.

FIG. 4 shows an exemplary tool system 300, which illustratively has handheld machine tool 100 of FIG. 1 and angular attachment 200 of FIGS. 2 and 3, for the illustration of an exemplary mounting of angular attachment 200 on handheld machine tool 100. The latter is shown in this instance only in sections, with the aid of a section of housing 110 of FIG. 1, at whose end face 112 machine interface 150 of FIG. 1 is situated, and in which output shaft 124 is supported in an illustrative roller bearing 324 in a rotationally movable manner, tool accommodation 140 of FIG. 1 being situated on output shaft 124. As was described for FIG. 1, machine interface 150 is here situated on transmission housing 119, according to one specific embodiment. In this connection, fastening element 151 is illustratively fastened to transmission housing 119, using suitable fastening members, e.g. screws or rivets.

To mount angle attachment 200 on machine interface 150 of handheld machine tool 100, angle attachment 200 is guided in direction 299 of FIG. 1 to machine interface 150 of FIG. 1 and is positioned against it in a specified angular position, in such a way that broadened region 283 of tube-shaped accommodation section 261 becomes situated in the region of fastening element 151 of machine interface 150. In this connection, operating member 297 of angle attachment 200 is brought using its free end 288 to lie against locking sleeve 149 of tool accommodation 140 of handheld machine tool 100, so that free end 269 of drive shaft 298 engages, in sections, in empty inner polygonal accommodation 148 of tool accommodation 140 and is prevented from a complete engaging by, for example, locking balls 249. These locking balls 249 or other suitable locking elements are acted upon by locking sleeve 149 of tool accommodation 140, for instance, in a manner known to one skilled in the art, radially inwards, in order thus to prevent the unhindered pushing in of drive shaft 298 into inner polygonal accommodation 148, locking sleeve 149 being acted upon by a spring element 497 in axial direction 199 of FIG. 1 pointing away from handheld machine tool 100.

In a further step, angle attachment 200 is now pushed in the direction of handheld machine tool 100, i.e. in direction 299, onto machine interface 150, for instance, until widened region 283 of tube-shaped accommodation section 261 lies against fastening element 151 of machine interface 150, so that by turning operating ring 264 of locking unit 260 of tool attachment 200, its bayonets 266, 268 are brought into engagement with bayonets 152, 154 of fastening element 151 and are thus able to be locked on these, so that locking unit 260 goes from its unlocked state to the locked state. In this locked state, attachment housing 210 of angle attachment 200 is acted upon by a specified spring force applied by spring element 280 of locking unit 260 of tool attachment 200 in direction 299 of handheld machine tool 100.

In addition, because of the pushing of tool attachment 200 onto machine interface 150, locking sleeve 149 of tool accommodation 140 is displaced by operating member 297 of angle attachment 200 against a spring force applied by spring element 497 in direction 299, so that free end 269 of drive shaft 298 is able to be pushed into inner polygonal accommodation 148. This makes possible mounting tool attachment 200 on handheld machine tool 100 using one hand, drive shaft 298 being accommodated so as to have play tangentially and axially, and may be exclusively for torque transmission in inner polygonal accommodation 148 of accommodation body 147 of tool accommodation 140.

Furthermore, beveled centering regions 276, 278 of tube-shaped accommodation section 261 of tool attachment 200 are brought to lie against centering aid 153 of fastening element 151 that is configured in the type of a ring-shaped conical surface 159. Consequently, a certain and reliable axial centering of tool attachment 200 is made possible on tool accommodation 140 and relative to output spindle 124 of handheld machine tool 100. In addition, angle setting toothing 274 of holding fixture element 272 of tool attachment 200 is brought into engagement with angle members 157 of fastening element 151. Thus the specified angular position is established for operating tool attachment 200 on handheld machine tool 100.

Subsequently, operating ring 264 of angular attachment 200, and thus entire angular attachment 200, is released, whereupon operating member 297 is acted upon, based on the spring force of spring element 497, by locking sleeve 149 of tool accommodation 140 in direction 199, so that an axial displacement is forced of entire angle attachment 200 in direction 199. Consequently, the bayonet connection between bayonets 266, 268 of tool attachment 200 and bayonets 152, 154 of fastening element 151 is additionally ensured.

FIG. 5 shows tool system 300 of FIG. 4 in the case of an exemplary change of the specified angular position of tool attachment 200 of FIGS. 2 and 3 fastened to handheld machine tool 100 of FIG. 1. For this purpose, attachment housing 210 of tool attachment 200 is axially displaced in the locked state by its locking unit 260 against the specified spring force by its spring element 280 in a direction facing away from handheld machine tool 100, i.e. direction 199 of FIG. 4. Thereby angle setting element 272 is also displaced axially in direction 199, so that the engagement of angle setting toothing 274 of angle setting element 272 with the angle setting members 157 of fastening element 151 is released and twisting attachment housing 210 to change the angular position is thus made possible. After such a change, attachment housing 210 is released again and is thus able to be fixed by the specified spring force of spring element 280 as described in connection with FIG. 4 in the changed angular position on machine interface 150.

What is claimed is:

1. A tool attachment, comprising:
   an attachment housing, on which a fastening element is situated for fastening to a handheld machine tool; and
   a fastening interface having an angular position setting unit for setting a specified angular position of the tool attachment on the handheld machine tool, and having a locking unit which, in a locked state, locks the tool attachment for operation on the handheld machine tool in the specified angular position, and, in the unlocked state, provides for drawing the tool attachment away from the handheld machine tool;
   wherein the angular position setting unit is operable in the locked state of the locking unit, to provide for a change in the specified angular position without unlocking the locking unit,
   wherein the angular position setting unit is operable by a combined longitudinal and rotational motion of the attachment housing for changing the specified angular position.

2. The tool attachment of claim 1, wherein the angular position setting unit has an angle setting element which is connected rigidly to the attachment housing.

3. The tool attachment of claim 2, wherein the attachment housing and the angle setting element are configured in one piece.

4. The tool attachment of claim 2, wherein the angle setting element is configured to be tube-shaped at least in sections and has an end face angle setting tooth ing.

5. The tool attachment of claim 2, wherein the angle setting element is supported in the locking unit to be longitudinally and rotationally movable.

6. The tool attachment of claim 1, wherein the locking unit has a locking body configured to be tube-shaped at least in sections.

7. The tool attachment of claim 6, wherein the locking body has locking elements which are configured like bayonets so as to provide a bayonet connection.

8. The tool attachment of claim 6, wherein the locking unit has an operating ring situated on the locking body, which is operable to lock the locking body to the handheld machine tool.

9. The tool attachment of claim 8, wherein the locking body and the operating ring are configured in one piece.

10. The tool attachment of claim 6, wherein a spring element is situated on the locking body, which is configured to apply a specified spring force to the attachment housing in the direction of the handheld machine tool, in the locked state.

11. The tool attachment of claim 10, wherein, in the locked state, the attachment housing is displaceable in a direction facing away from the handheld machine tool, against the specified spring force.

12. The tool attachment of claim 1, further comprising:
   a drive shaft to which an operating member is assigned, which is configured, during fastening of the tool attachment to the handheld machine tool, to displace a locking sleeve, associated with a tool accommodation of the handheld machine tool, against a spring force applied by an associated spring element in a direction of the handheld machine tool.

13. A tool system, comprising:
   a handheld machine tool;
   a tool attachment, which has an attachment housing, on which a fastening interface is situated for fastening to the handheld machine tool, the fastening interface having an angular position setting unit for setting a specified angular position of the tool attachment on the handheld machine tool, and having a locking unit which, in a locked state, locks the tool attachment for operation on the handheld machine tool in the specified angular position, and, in the unlocked state, provides for drawing the tool attachment away from the handheld machine tool;

wherein the angular position setting unit is operable in the locked state of the locking unit, to enable a change in the specified angular position without unlocking the locking unit, wherein the angular position setting unit is operable by a combined longitudinal and rotational motion of the attachment housing for changing the specified angular position.

14. A tool attachment, comprising:

an attachment housing, on which a fastening element is situated for fastening to a handheld machine tool; and a fastening interface having an angular position setting unit for setting a specified angular position of the tool attachment on the handheld machine tool, and having a locking unit which, in a locked state, locks the tool attachment for operation on the handheld machine tool in the specified angular position, and, in the unlocked state, provides for drawing the tool attachment away from the handheld machine tool;

wherein the angular position setting unit is operable in the locked state of the locking unit, to provide for a change in the specified angular position, wherein the angular position setting unit has an angle setting element which is connected rigidly to the attachment housing, wherein the angle setting element is configured to be tube-shaped at least in sections and has an end face angle setting toothing.

15. A tool attachment, comprising:

an attachment housing, on which a fastening element is situated for fastening to a handheld machine tool; and a fastening interface having an angular position setting unit for setting a specified angular position of the tool attachment on the handheld machine tool, and having a locking unit which, in a locked state, locks the tool attachment for operation on the handheld machine tool in the specified angular position, and, in the unlocked state, provides for drawing the tool attachment away from the handheld machine tool;

wherein the angular position setting unit is operable in the locked state of the locking unit, to provide for a change in the specified angular position without unlocking the locking unit, wherein the angular position setting unit has an angle setting element which is connected rigidly to the attachment housing, wherein the angle setting element is supported in the locking unit to be longitudinally and rotationally movable.

\* \* \* \* \*